No. 727,554. PATENTED MAY 5, 1903.
A. H. PHILLIPS.
BAG MAKING AND FILLING MACHINE.
APPLICATION FILED DEC. 2, 1899.
NO MODEL. 8 SHEETS—SHEET 2.
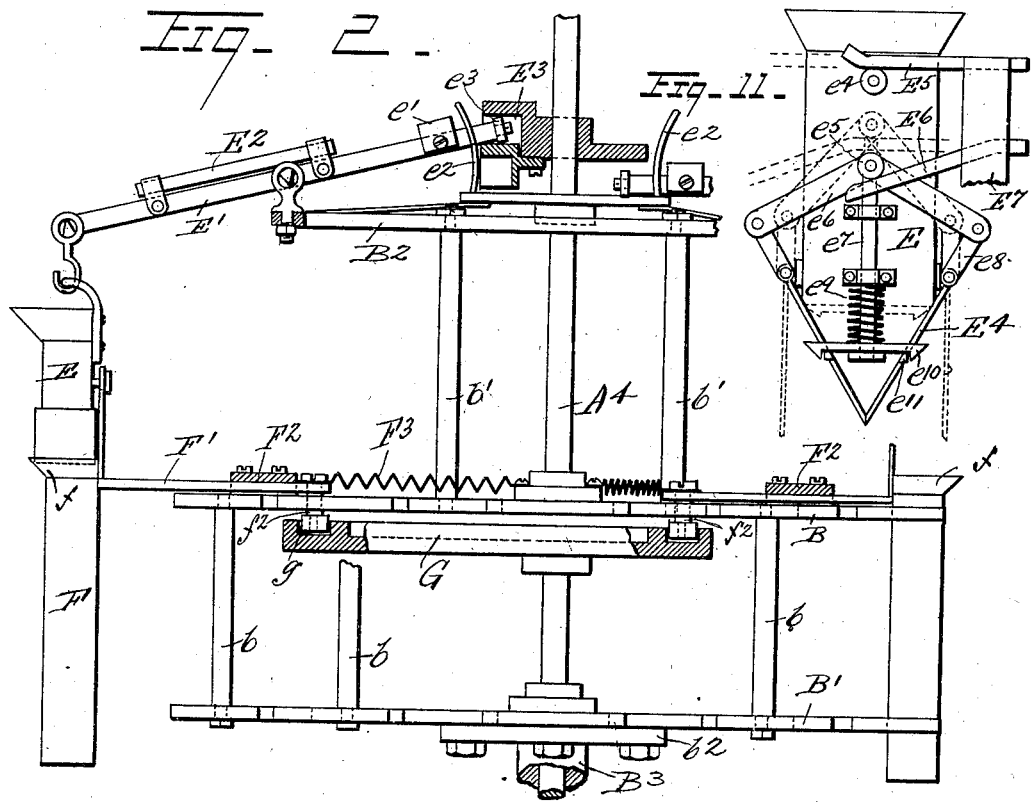
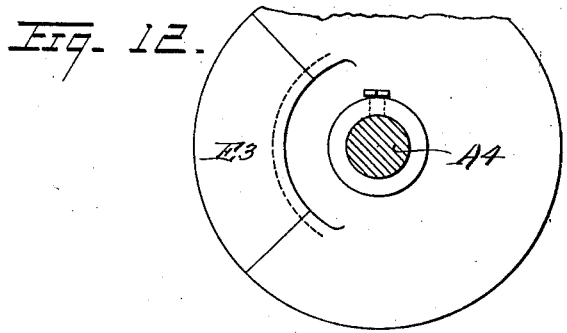
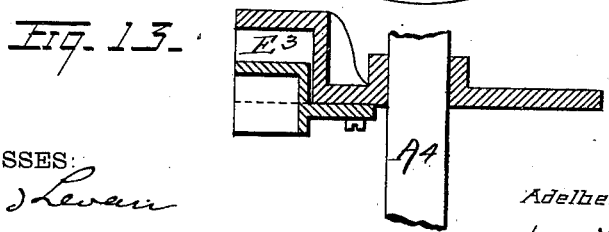
WITNESSES:
David Leven
D. M. Stewart
INVENTOR
Adelbert H. Phillips
by

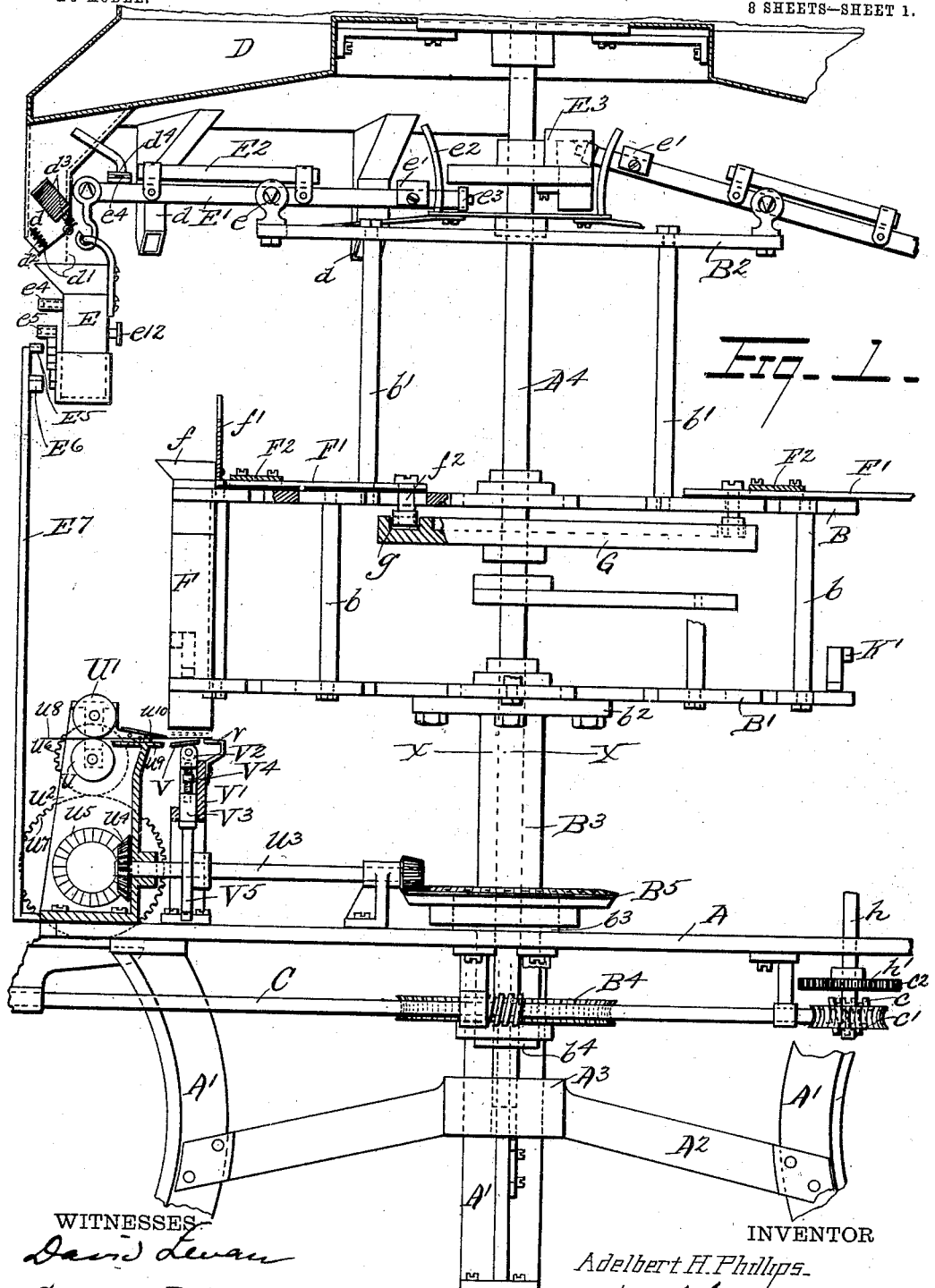

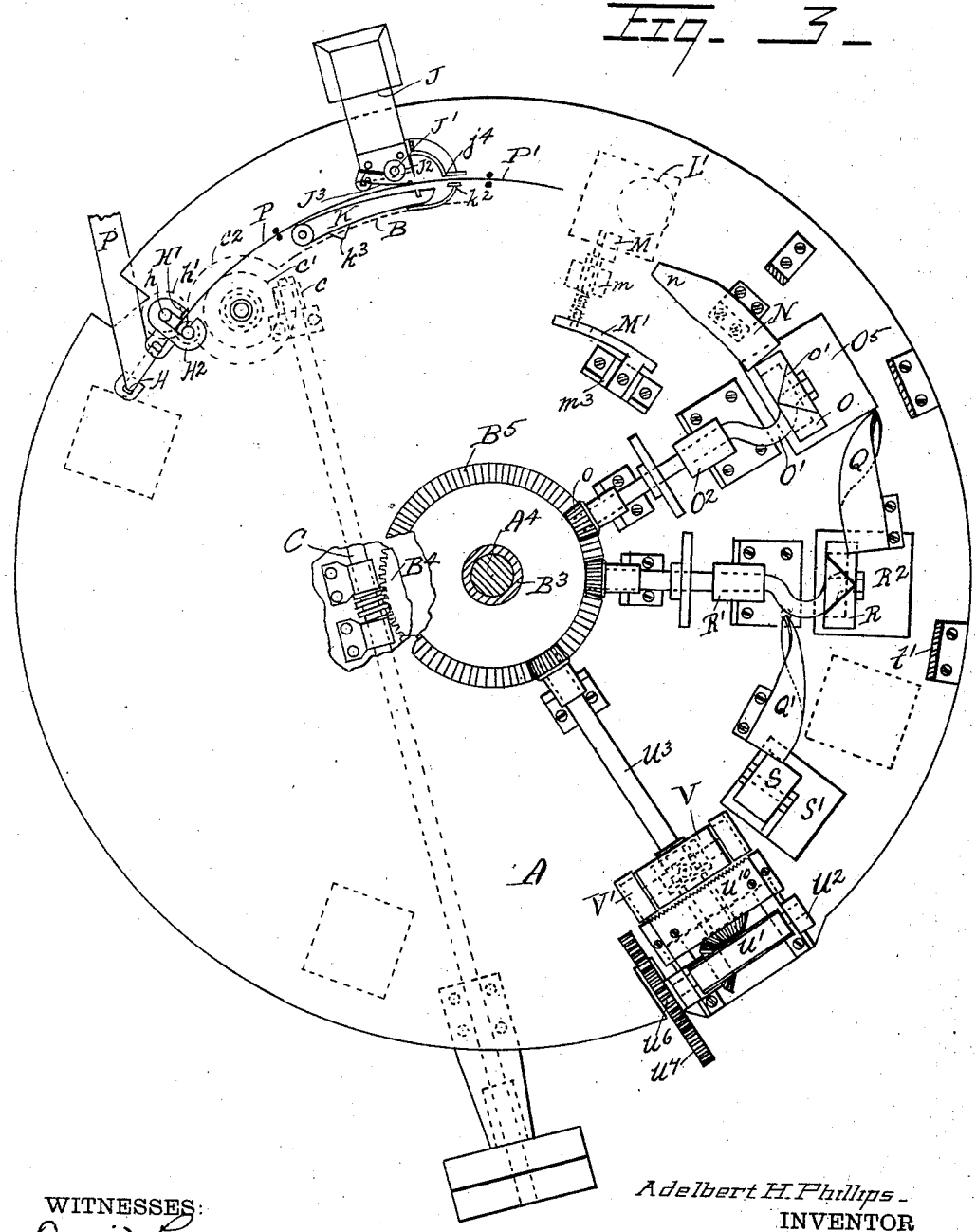

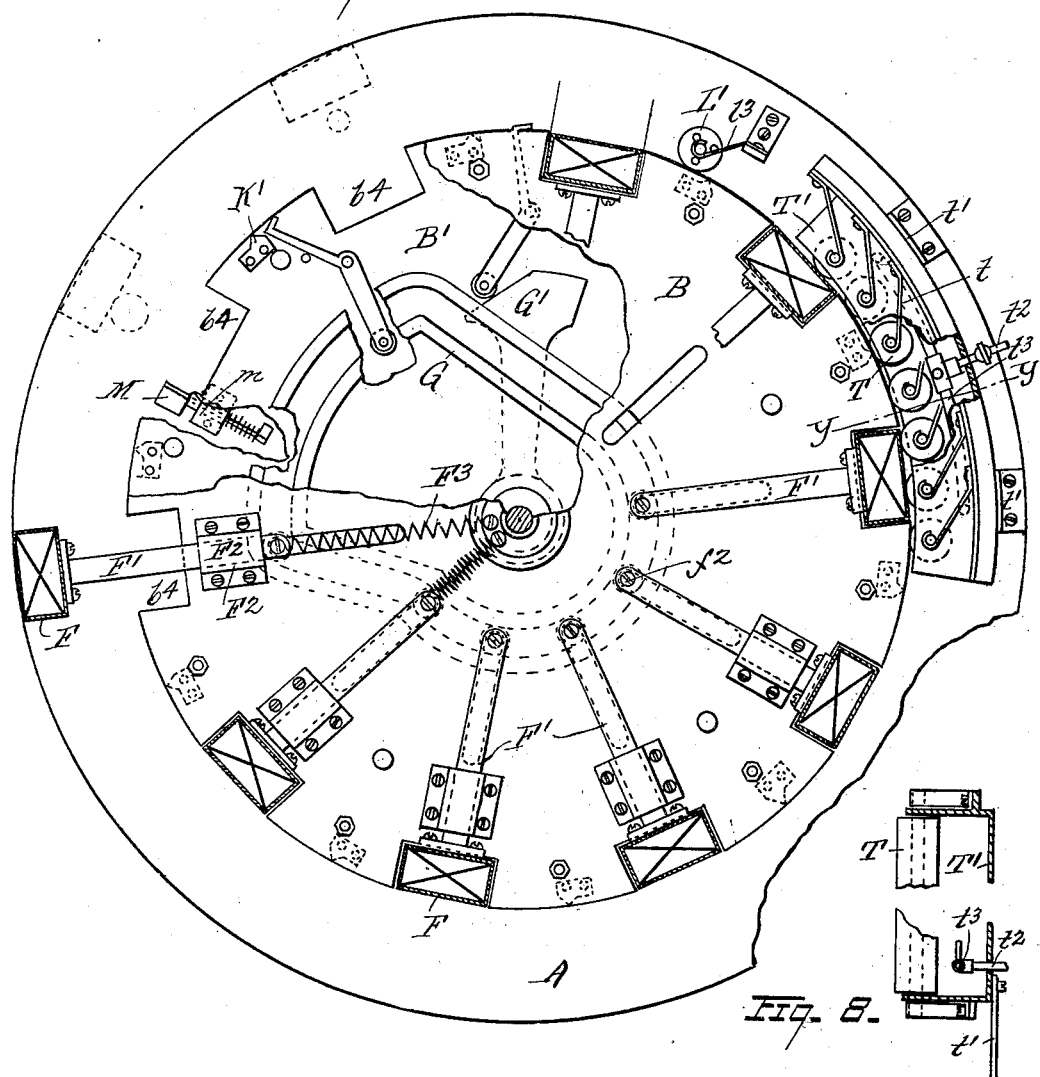

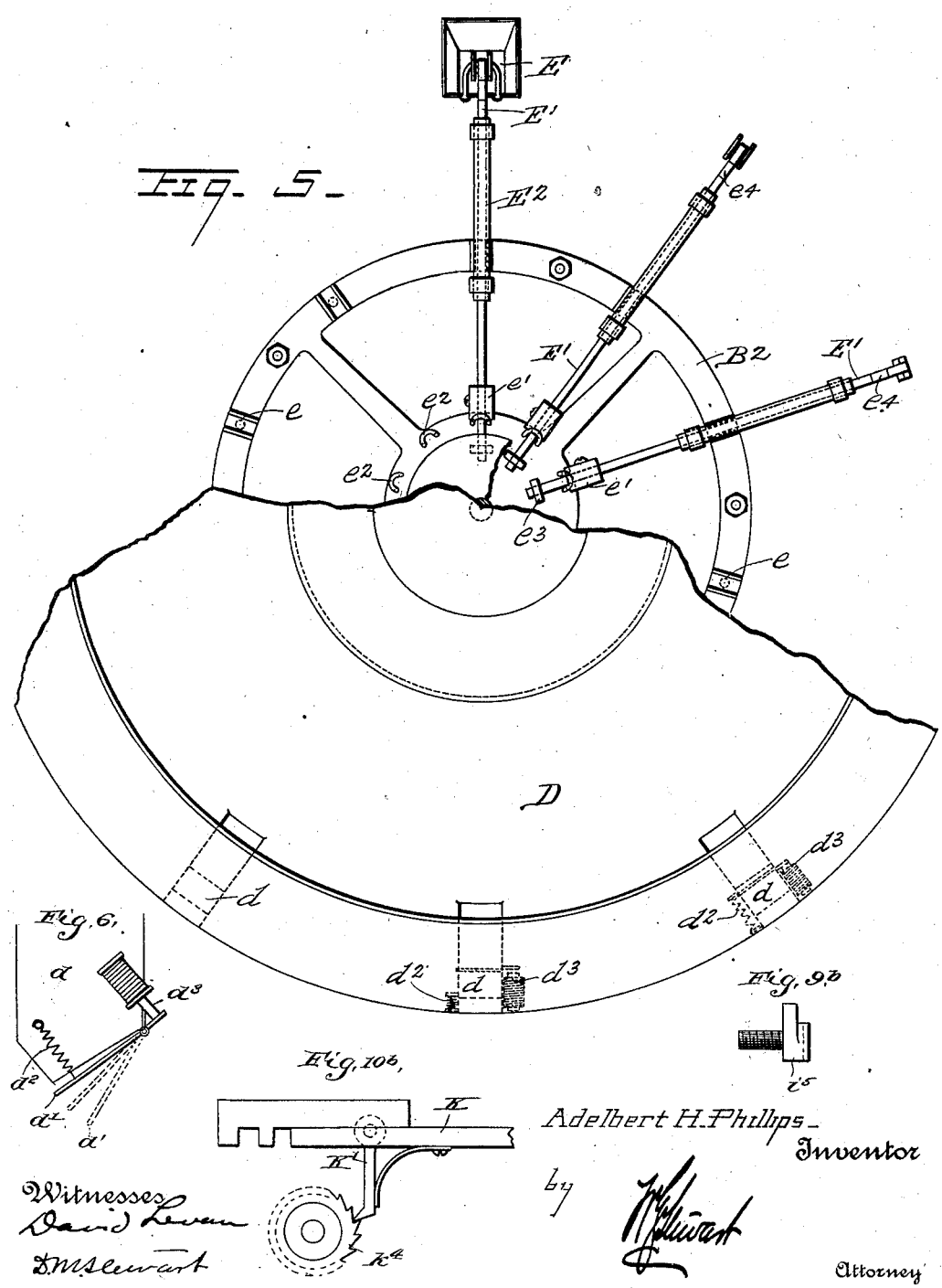

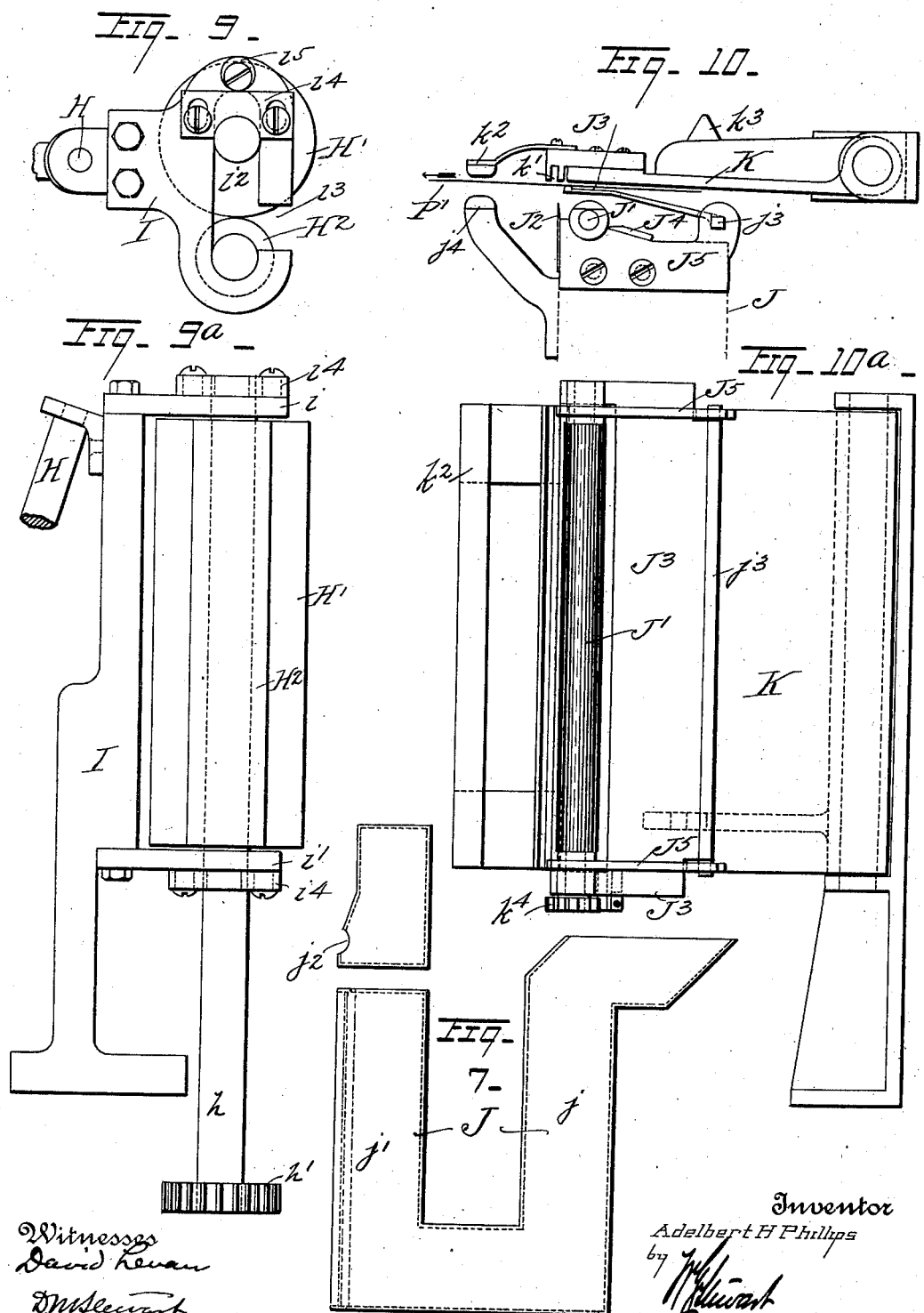

No. 727,554. PATENTED MAY 5, 1903.
A. H. PHILLIPS.
BAG MAKING AND FILLING MACHINE.
APPLICATION FILED DEC. 2, 1899.
NO MODEL. 8 SHEETS—SHEET 7.
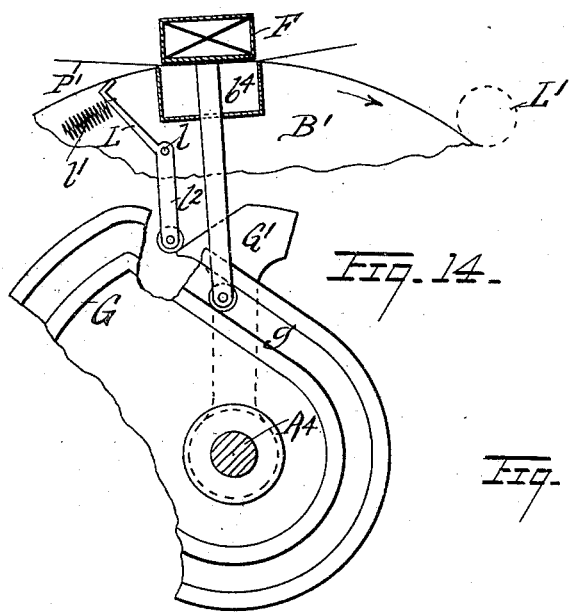
Fig. 14.
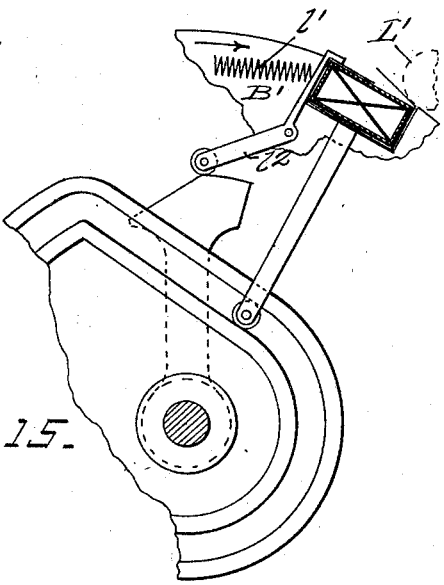
Fig. 15.
Fig. 16.
Fig. 17.
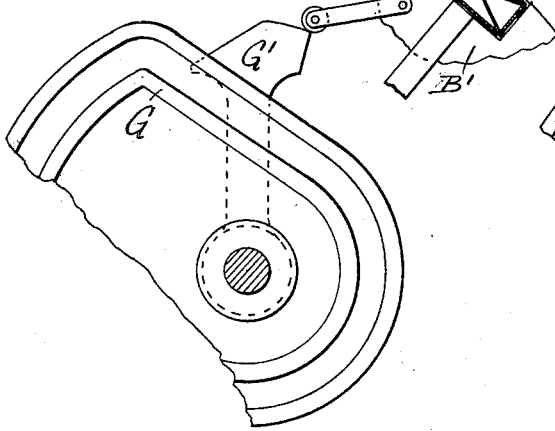
WITNESSES:
David Levan
DM Stewart
INVENTOR
Adelbert H. Phillips.
by Stewart atty.

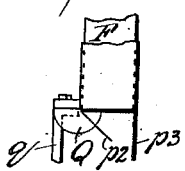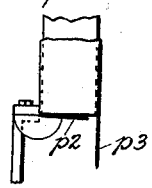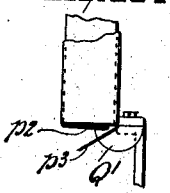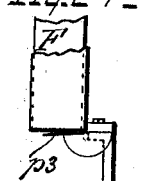
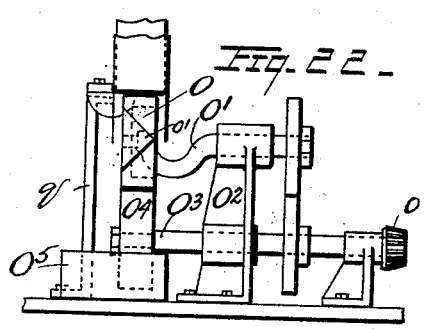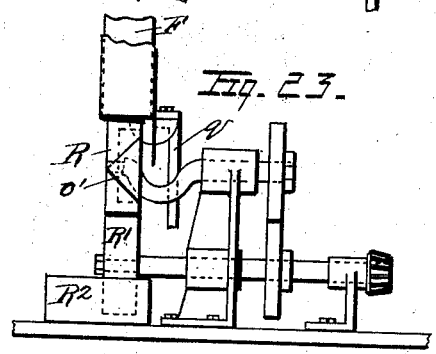
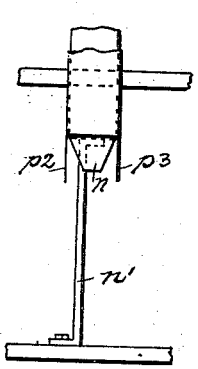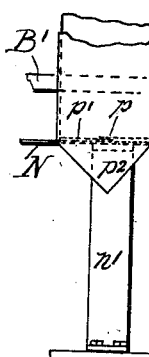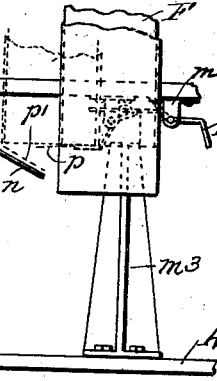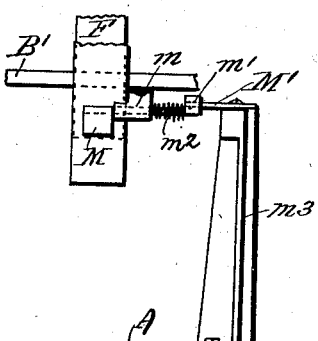

No. 727,554. Patented May 5, 1903.

UNITED STATES PATENT OFFICE.

ADELBERT H. PHILLIPS, OF PHILADELPHIA, PENNSYLVANIA, ASSIGNOR, BY MESNE ASSIGNMENTS, TO AUTOMATIC PACKING AND WEIGHING MACHINE COMPANY, A CORPORATION OF DELAWARE.

BAG MAKING AND FILLING MACHINE.

SPECIFICATION forming part of Letters Patent No. 727,554, dated May 5, 1903.

Application filed December 2, 1899. Serial No. 738,976. (No model.)

*To all whom it may concern:*

Be it known that I, ADELBERT H. PHILLIPS, a citizen of the United States of America, and a resident of the city and county of Philadelphia and State of Pennsylvania, have invented certain new and useful Improvements in Bag Making and Filling Machines, of which the following is a specification.

My invention relates to that class of packaging-machines in which the making of the packages and the filling of the same with a specified weight of material are simultaneously and automatically carried on.

One important object of my invention is to provide for a continuous non-intermittent operation of the machine as a whole; and the invention consists both in the novel construction of the various devices employed to effect different steps in the operation of the machine and in the general arrangement of the coöperating parts, so as to accomplish by their joint action the final effect desired.

The automatic weighing mechanism forming part of the complete apparatus shown is particularly described and claimed in a divisional application, Serial No. 59,177, filed by me May 7, 1901.

The invention is fully described in connection with the accompanying drawings, in which—

Figure 1 is a partly sectional elevation of a machine having parts thereof removed. Fig. 2 is a partial sectional elevation showing some of the parts in different position from Fig. 1. Fig. 3 is a plan view of the bed-plate of the machine, indicating most of the top attachments thereto, the section being on the line $x\ x$ of Fig. 1. Fig. 4 is a plan view of the rotary bag-forming table with a portion of the top plate cut away, showing also the vertical rollers on the bed-plate. Fig. 5 is a plan view of a portion of the rotary weighing-table; and Fig. 6 is a similar view of a portion of the hopper, indicating the series of feed outlets or nozzles for the weighing-pan. Fig. 7, Sheet 8, shows separate views of the vertical paste-box. Fig. 8, Sheet 4, is a cross-sectional elevation, on line $y\ y$ of Fig. 4, of the hot-roll casing. Figs. 9 and $9^a$ are respectively a top view and an elevation of the vertical feed-roll mechanism for the bag-paper. Figs. 10 and $10^a$ are similar views of the vertical pasting and cutting mechanism therefor. Fig. 11, Sheet 2, is a detail view of the weighing-pan and the discharge mechanism therefor. Figs. 12 and 13, Sheet 2, are separate views of the scale-beam-operating cam. Figs. 14, 15, 16, and 17 show the several positions of the parts in making all the vertical folds of the paper to form the bag. Figs. 18 and 19 show the mechanism for making the first and second bottom folds, respectively, two revolving bags (on their formers) being shown, one without having any bottom fold made, the other with two of the folds completed, while the intermediate position is indicated in dotted lines. Fig. 20 is an elevation taken at right angles to Fig. 18, and Fig. 21 is an elevation taken at right angles to Fig. 19. Figs. 22 and 23 show the bottom-pasting mechanism for use prior to the making of the third and fourth bottom folds, respectively. Figs. 24 and 25, in connection with Fig. 22, indicates the manner of making the third bottom fold; and Figs. 26 and 27 in like manner indicate the making of the last bottom fold.

A represents the bed-plate of the machine, which, as shown, is circular in form and supported upon legs A', which are connected by arms $A^2$ with a central support $A^3$ for a fixed central column $A^4$. Upon the latter is rotatably mounted the bag-forming table, made up of a top plate B and bottom plate B', connected by posts $b$, and the weighing-table or ring $B^2$, which is connected with the bag-forming table by posts $b'$, these tables being carried above the bed-plate A by a sleeve $B^3$ on the column $A^4$ to the top flange $b^2$, of which sleeve the bag-forming table is secured, while the lower flange $b^3$ of the same bears upon the bed-plate A. A bottom extension $b^4$ of the sleeve passes through the bed-plate for attachment of a worm-wheel $B^4$, through which rotary movement is imparted to the sleeve and the tables carried thereby from a driving-shaft C, suitably mounted under the bed-plate.

Upon the top of the fixed central column $A^4$ is carried a fixed hopper D, adapted to receive and hold a supply of the material to be packaged, said hopper being of any preferred form so far as the main body is concerned, but being provided with a series of bottom discharge-outlets $d$ $d$ $d$, arranged a convenient distance apart and adapted to discharge successively into each of a circular series of receiving and weighing pans E, carried by the rotary weighing-table $B^2$, as each pan is successively swung under said series of outlets, the object being to deliver into each pan just the desired amount of material without intermitting the rotary movement of the weighing table or pans. To accomplish this, I preferably provide each outlet $d$ from the hopper with a hinged gate $d'$, which is normally held closed by a spring $d^2$, but which is so arranged as to be opened automatically by an electromagnet $d^3$ while any one of the weighing-pans is in proper position below it, an electric circuit through the magnet-coil being closed, as indicated in the drawings, by contact of a circuit-closer $e^4$ on the moving weighing-pan scale-beam E' with a fixed member $d^4$ in the circuit. The gate of the first one or more outlets should be arranged to open wide, so as to deliver rapidly into the moving weighing-pan, the gate being closed by the spring $d^2$ before the pan has passed the outlet by the opening of the circuit through the electromagnet. Succeeding gates $d'$ are similarly opened and closed automatically as the pan passes beneath them; but the size of the opening and the flow of material are reduced as the pan is gradually filled until from the last outlet a mere trickle of material may be delivered into the pan to complete the amount required to depress the end of the scale-beam.

Each of the circular series of weighing-pans E is carried upon the outer end of a radially-arranged scale-beam E', which is pivoted intermediately at $e$ to a bearing on the weighing-table $B^2$. The inner end of each beam is provided with an adjustable weight $e'$ and with an end roller $e^3$ and is guided in vertical guideways $e^2$, fixed to the table $B^2$. A mercury-tube $E^2$ is also preferably provided on each scale-beam, the purpose of which is to throw the additional weight of a quantity of mercury contained in said tube toward the outer end of the beam as soon as the latter has been slightly depressed by the filling of the pan E, thus giving a more positive downward tendency to said pan. In order to retain control of the vertical swing of the weighing-pans E, so that the latter may be properly operated for delivery into the package or bag, as hereinafter described, I provide a cam $E^3$ on the fixed central column $A^4$, in which each roller $e^3$ on the beam end rides and by which the vertical movement of the beam and weighing-pan is controlled, as may be required.

Having thus described my continuous and automatic weighing mechanism, whereby accurately-measured quantities of the material operated on are continuously provided, I will now describe the coöperating bag-forming mechanism, which is arranged and timed so as to produce a suitable package for each measure of material and also to automatically present such package as formed so as to receive the measured article from the aforesaid weighing mechanism.

The bag-forming mechanism comprises, as already stated, the top and bottom plates B and B', connected together by posts $b$ and to the weighing-table $B^2$ by posts $b'$, the whole being rotated around the fixed shaft or column $A^4$ through the medium of the connected sleeve $B^3$ on the latter, which is in gear with the driving-shaft C. The peripheries of the top and bottom plates B and B' are each provided with a series of former-recesses $b^4$ $b^4$, which are adapted to receive correspondingly-shaped formers F, around which the paper is bent to form the packages, said formers being carried by radially-guided arms F', arranged to move in guideways $F^2$ on the plate B, and being normally retracted, so as to enter said recesses, by a series of springs $F^3$, while at the same time subject to positive outward and inward movement by the action of a fixed cam G, secured to the central column $A^4$ and with which each former-arm F' is in engagement by means of rollered pins $f$ thereof entering the camway $g$. The formers F, as shown, are each of hollow rectangular shape, with a flaring top $f$ extending above the top plate B, while the bottom portion depends below the plate B'.

The paper P, from which the bags are formed, is automatically fed to the machine from a roll suitably mounted adjacent to the machine, the feed-rolls therefor, as well as mechanism for cutting and pasting the same, being secured to the bed-plate A. Referring to Figs. 3 and 9, (Sheet 3,) H represents a suitably mounted guide-roll on the bed-plate, over which the paper passes to and through a pair of vertical feed-rolls H' $H^2$, of which H', as shown, is rotated from the driving-shaft C through a worm $c$, worm-wheel $c'$, and gears $c^2$ and $h'$, the latter fixed to the shaft $h$ of the driven feed-roll. These rolls are preferably mounted in a frame I, fixed to the bed-plate, between top and bottom bearing-plates $i$ and $i'$, which are slotted, as indicated at $i^2$ $i^3$, to permit the ready introduction or removal and adjustment of the rolls, the latter being effected, as indicated, by means of top and bottom slides $i^4$ $i^4$, which are set by an eccentric $i^5$ so as to secure and maintain proper contact of the feed-rolls with the paper which is fed between them. Passing from the feed-rolls H' $H^2$, the free end of the paper P is pressed into and through a vertical pasting and cutting mechanism, which cuts off a sufficient length of paper to somewhat more than inclose the former F and also applies paste to the overlapping edge, the width of the paper being of course made to suit the required depth of the bag. This pasting and cutting mechanism, as shown, comprises a paste-box J, fixed to the bed-plate, the form of which is U-shaped, with the space between the upright members adapted to permit the passage of the projected former F. The outer member $j$ is somewhat higher than the inner member $j'$, so as to permit of the latter being kept sufficiently full with paste to insure a supply to the full length of the vertical paste-roll $J'$, which latter is arranged to close a vertical opening $j^2$ in the inner wall of the paste-box and is rotatably mounted in top and bottom bearing-plates $J^5$ $J^5$ on the paste-box. This form of paste-box is specially adapted to suit the requirements arising from the temporary projection of the bag-former and secure the advantages of a considerable storage capacity for paste and accessibility for filling the same. A vertical knife $J^2$, fixed to the paste-box, has its cutting edge projecting somewhat therefrom toward the central column $A^4$ of the machine, so as to lie practically in the path of the onwardly-fed paper P, which passes between said knife and a vertical cutter-plate K, pivoted at one end $k$ on a support from the bed-plate A and having a vertically-grooved outer end $k'$, adapted to cooperate with the fixed knife $J^2$ when pressed toward the latter, as hereinafter described, so as to cut the paper. A flipper-plate $J^3$, pivoted at $j^3$ to the bearing-plate $J^5$ on the paste-box, is arranged to normally keep the feed-paper away from the cutting edge of the knife $J^2$, while yielding to the cutting movement of the cutter-plate K. A padded spring extension $k^2$ is provided on the latter, which operates in connection with an arm $j^4$ on the paste-box to firmly hold the paper P preparatory to the cutting operation. To the bottom of the cutter-plate K is pivoted a spring-pawl $K'$, which is adapted when the cutter-plate is moved toward the knife $J^2$ to engage a ratchet-wheel on the bottom of the vertical paste-roll, and thus turn the latter so as to present a new paste-surface to the paper, which is pressed against it at each cutting operation, so as to provide for subsequently uniting the lapping edges in forming the bag. A doctor-plate $J^4$ is so arranged as to remove from the surface of the roll any surplus of paste which might otherwise adhere thereto. The repeated movements of the cutter-plate K, which thus effect cutting off and vertical pasting of the portions of paper required to form the bags, is produced, as shown, by a series of trips $K'$, fixed to the rotating bag-table plate $B'$ and adapted to contact successively with a projection $k^3$ on said cutter-plate, so as to effect such movements at the proper times. The strip of paper $P'$ thus cut off from the roll has been moved into position between a projected bag-former F and the recessed periphery of the table B B', as indicated in Fig. 14, (Sheet 6,) and as said bag-former is retracted into the recesses $b^4$ of the table by the action of the fixed cam G, as indicated in Fig. 15 and Fig. 4, the paper $P'$ is folded around the three sides of the former, with the opposite ends projecting beyond the periphery of the table B B'. The means provided for folding over these projecting ends of the paper against the outer face of the former consist, as shown, first, of a folding-plate L for each former, pivoted at $l$ to the rotating bag-forming table B B', and, second, of a vertical roller $L'$, carried by the bed-plate A. Each of the series of folding-plates L is normally held by a spring $l'$ in the position indicated in Fig. 14; but as the rotary movement of the table completes the retracting movement of the former F into the recesses $b^4$ an arm $l^2$ of the folding-plate comes into contact with another fixed cam $G'$ on the central column $A^4$, and the continued rotation of the table in the direction of the arrow causes a forward swing of the folding-plate L, which bends the rear projecting end of the paper $P'$ over against the outer face of the former, as indicated in Fig. 15. By the time this is effected the other projecting end of the paper has come into contact with the relatively fixed roll $L'$ on the bed-plate and is gradually folded over upon the first folded end and smoothly pressed thereon to properly set the paste by passage of the roll $L'$ over the whole surface, spring-bearings $l^3$ being preferably employed to provide a yielding pressure of the roll. The folding-plate L is freed from the cam $G'$ and retracted by the spring $l'$ in time to permit the free passage of the roll, as indicated in Figs. 16 and 17. The first and second bottom folds are made in a manner somewhat similar to the vertical folds just described, as indicated particularly in Figs. 18 to 21, in connection with Fig. 3. The bottom-folding blade M is secured to a horizontal shaft which is rotatably mounted in a bearing $m$, fixed to the under side of the bag-forming table $B'$, and an arm $m'$ is provided at the opposite end of said shaft and is normally held by a spring $m^2$ in position to be struck as it revolves with said table by a suitably-located fixed finger $M'$, secured to a bracket $m^3$ on the bed-plate. When thus struck by the fixed finger $M'$, the folding-plate M is swung from the position indicated in full lines in Fig. 18 to that indicated in dotted lines in the same figure, thus making the first bottom fold $p$ of the bag. By the time this is effected the opposite bottom fold $p'$ has been partially made by contact of the depending bag-paper with the inclined face $n$ of a folder-plate N, which is located in the path of the revolving formers F upon a stand $n'$ on the bed-plate A. In Fig. 19 the former is shown passing over the top of the fixed plate N, with the two first bottom folds completed. Immediately after passing this plate N the partially-closed bottom of the bag rides upon a paste-roll O, which is mounted in its path upon a shaft $O'$, rotating in a standard $O^2$ on the bed-plate of the machine, said roll and shaft being in engagement with a lower roll $O^4$ and shaft $O^3$, to which motion is conveyed from the sleeve $B^3$ on the central column $A^4$ through a pinion-wheel $B^5$, fixed to said sleeve and a pinion $o$ on the inner end of the shaft $O^3$. The paste is carried in a paste-box $O^5$ on the bed-plate, into which the lower roll $O^4$ dips and carries paste upward to the contacting roll O, a doctor-plate being provided on the paste-box to remove any surplus from the lower roll $O^4$. The roll O is preferably provided with a V-shaped projection $o'$, which alone received and applied the paste. After passing over the paste-roll O, and thus having a layer of paste applied to its partially-formed bottom, the bag is carried into contact with a spiral blade Q, fixed to a standard $q$ on the bed-plate, which engages the depending side $p^2$ of the bag and gradually folds the same upward against the previously-made folds, as indicated in Figs. 24 and 25, after which it is carried over another paste-roll R, similar to the paste-roll O already described, and similarly operated from the sleeve-pinion wheel $B^5$ and supplied with paste from a similar paste-box $R^2$, said roll R serving to press the last-folded side $p^2$ of the bag firmly against the previously-pasted fold $p'$ and at the same time applying a layer of paste upon the outer face of the fold $p^2$ for attachment thereto of the last-made fold $p^3$. This last fold is made like the one just described by a similar but oppositely-twisted spiral plate $Q'$, so located above the bed-plate as to engage and fold it, as indicated in Figs. 26 and 27. An additional roller S (shown in Fig. 3) may be employed to more thoroughly unite the bottom folds and to apply paste if it be desired to secure a sealing-strip to the bottom, as hereinafter described.

At the same time that the bottom folding operations described are being carried on the vertical seam of the bag is being dried, as shown, by a series of vertical hot rollers T, carried on spring-arms $t$ within a casing $T'$, fixed to standards $t'$ on the bed-plate, said rollers being preferably heated by gas-jets from a gas-supply pipe $t^2 t^3$, as indicated in Figs. 4 and 8.

The bag having been formed as described may without further operation thereon be used to receive the material to be packaged; but I prefer to perfect the bag construction by applying a sealing-strip to the bottom thereof, which will serve the double purpose of insuring tightness of the package and improving the appearance of the same. To this end, therefore, I provide a sealing-strip mechanism comprising suitable feed-rolls for a continuous strip of paper and means for automatically cutting off and applying a portion of the latter. As shown, these feed-rolls U and $U'$ for the sealing-strip are carried in a standard $U^2$ on the bed-plate and are driven from the central pinion-wheel $B^5$ on the column-sleeve $B^3$ through a shaft $U^3$, bevel-wheels $U^4 U^5$, and spur-gears $U^6 U^7$, the direction of feed of the paper $U^8$ being from a suitably-mounted outer roll radially inward. The free end of this strip of paper passes between a fixed table $U^9$ and a top cutter-plate $U^{10}$ and thence over a plunger-plate V, the extreme outer end preferably resting upon a shelf $v$ on the plunger-frame $V'$. The plate V is pivoted to the top of a plunger which is guided vertically in the plunger-frame $V'$ and is preferably formed in two parts $V^2 V^3$, adjustably united by a screw-threaded connecting-stud $V^4$, as shown. An upward movement is imparted to this plunger at proper intervals to effect the cutting off of a suitable length of paper from the strip $U^8$ by means of a cam-wheel $V^5$ on the shaft $U^3$, said movements being so timed as to push the cut-off strip against the bottom of a bag which is carried above it by one of the revolving formers F, said bottom having been previously provided in the construction shown with a layer of paste by the roll S, already referred to, which is arranged to dip into a paste-pot $S'$ on the bed-plate. The application of this sealing-strip, which may be made to serve as a label, if desired, completes the construction of the bag, though the bottom may be subsequently passed over a series of horizontal drying-rolls, (not shown,) similar to the vertical rolls T. The former F, which carries the bag, is then moved radially outward by engagement with the eccentric portion of the fixed cam G, so as to bring the flaring mouth $f$ of the former directly under one of the weighing-pans E, which has been automatically filled from the hopper D and lowered by the fixed cam $E^3$, as previously described. While the parts E and F are revolving together in this relative position, in which they are firmly held by engagement of the pin $e^{12}$ on the pan with a bracket $f'$ from the former, the hinged bottom gates $E^4$ of the weighing-pan E, Figs. 1 and 11, are automatically opened by means of the fixed fingers $E^5 E^6$, carried from the bed-plate A on a standard $E^7$ and arranged in the path of the weighing-pan, so as to engage a fixed projection $e^4$ on the outer face of the pan and a movable pin $e^5$ at the junction of links $e^6 e^6$, connecting the gate-arms $e^8 e^8$ with the centrally-guided rod $e^7$, carrying a locking-bar $e^{10}$, which when depressed by a spring $e^9$, adapted to normally close the gates $E^4$, engages the latter, so as to positively hold them closed until said locking-bar is raised by the passing of the projections $e^4 e^5$ between the fixed fingers, as indicated in dotted lines, Fig. 11, which passage also positively opens the gates, as shown, thus delivering the contents into the bag, which latter is thereby forced off from the former F, to be caught and subsequently packed and closed in any suitable manner.

It is obvious that the preferred mechanism specifically shown and described may be considerably modified in detail and in arrangement and that some features may be employed in a different relation and some entirely omitted, all without departing from my invention. I do not, therefore, desire to limit my invention to the specific construction shown; but

What I claim is—

1. In a packaging-machine the combination with a bed-plate having a central column rising therefrom, of a rotary bag-former table and weighing-table mounted on said column, a feed-hopper above the same, bag-forming mechanisms fixed to the bed-plate and adapted to coöperate with the rotary bag-former table, and receiving vessels carried by said weighing-table arranged to coöperate with the feed-hopper and with the bag-former mechanism.

2. In a packaging-machine the combination of a rotary bag-former mechanism comprising a circular series of radially-movable bag-formers, a rotary weighing mechanism comprising a corresponding circular series of receiving pans or vessels carried on radial scale-beams, and discharging mechanism for said pan or vessel; the outward movement of each bag-former with finished bag thereon being timed to suit the downward swing of the loaded receiving-pan and the fixed discharging device being located in the path of the lowered pan.

3. In a packaging-machine a horizontal rotating bag-former table having a series of peripheral recesses or pockets, a corresponding series of radially-movable hollow bag-formers adapted to serve as filling-funnels, means for automatically moving each of said formers successively into the corresponding recesses and thereafter projecting the same beyond the periphery of the table, and a filling mechanism arranged to deliver into the projected bag-formers.

4. In a package-machine the combination with a bed-plate having a central fixed column rising vertically therefrom, a rotary bag-former table mounted on said column and having a series of peripheral recesses or pockets, and a corresponding series of radially-movable bag-formers fitted to said recesses, of mechanism on the bed-plate for automatically feeding a bag-strip of paper to each passing bag-former for pasting a vertical edge of said strip, and for folding one projecting end of the bag-strip upon the retracted former, and a series of folding-plates for the other end of said strip pivoted to the rotary table and operated by a fixed cam, substantially as set forth.

5. In a package-machine the combination with a bed-plate, a rotary bag-former table mounted thereon, and coöperating mechanism for forming folded-bottom bags on said formers, of a bottom-sealing mechanism on said bed-plate operating in connection with said rotary table and comprising a feed mechanism and a plunger mechanism timed to apply a bottom-sealing piece to each bag carried above the same on the revolving formers.

6. In a package-machine the combination with a bed-plate, a rotary bag-former table mounted thereon, and coöperating mechanism for forming folded-bottom bags on said formers, of a device for applying paste to the folded bottom of each bag and a bottom-sealing mechanism on said bed-plate operating in connection with said rotary table and comprising a feed mechanism and a plunger mechanism timed to apply a bottom-sealing piece to each bag carried above the same on the revolving formers.

7. In a package-machine a bag-strip-feed mechanism comprising a pair of feed-rolls, top and bottom bearing-plates having open slots adapted to admit the roll-axles and adjustably-secured slides on said plates for relatively adjusting the feed-rolls.

8. In a package-machine a bag-strip-feed mechanism comprising suitably-mounted feed-rolls, in combination with a cutting mechanism having a fixed knife and paper-grip arms, and a movable cutter-plate with yielding grip-arm coöperating therewith substantially as set forth.

9. In a package-machine a bag-strip-feed mechanism comprising suitably-mounted feed-rolls and a cutting mechanism having a fixed knife and paper-grip arm, a movable cutter-plate with yielding grip-arm coöperating therewith and an intermediate flipper-plate, substantially as shown.

10. In a package-machine a bag-strip-feed mechanism comprising suitably-mounted feed-rolls and a cutting and edge-pasting mechanism having a fixed knife and paste-roll with means for supplying the latter, and a movable cutter-plate coöperative with said fixed knife and having a pawl-and-ratchet engagement with said paste-roll to simultaneously rotate the latter substantially as set forth.

11. In a package-machine the combination with a rotary bag-former table carrying radially-movable bag-formers, of a fixed paste-box rising between the projected bag-former and the periphery of the rotary table and having a vertical opening and a paste-roll arranged to close said opening substantially as set forth.

12. In a package-machine the combination with a rotary bag-former table having a series of bag formers or carriers at the periphery thereof, of a bottom-closing mechanism comprising a series of forward-folding devices mounted on said rotary table adjacent to each bag former or carrier, each of said devices having a folding-blade secured to a rocking shaft mounted below the table and a contact-arm, and a fixed finger arranged in the path of said contact-arm, all substantially as set forth.

13. In a package-machine the combination with a rotary bag-former table having a series of bag formers or carriers at the periphery thereof, of a bottom-closing mechanism comprising a series of forward-folding devices mounted on said rotary table adjacent to each bag former or carrier, a fixed finger arranged in the path of said forward-folding devices to successively operate the same, and other fixed devices arranged in the path of said bag-formers and arranged to successively affect the rearward and side folds, all substantially as set forth.

14. In a package-machine the combination with a bag-carrier mechanism of a bottom-sealing mechanism comprising a vertically-guided plunger, a plate forming the plunger-head, feed-rolls for the sealing-strip, and a shearing-plate forming jointly with said plunger-head a support for the sealing-strip, substantially as set forth.

15. In a package-machine the combination with a rotary bag-former table having a series of bag formers or carriers at the periphery thereof, of a bottom-sealing mechanism comprising standards fixed to the bed-plate of the machine beneath said table, horizontal feed-rolls and a vertically-movable plunger mounted in said standard, and operated from the table-shaft, and a shearing-plate coöperating with the head of the plunger, substantially as set forth.

16. In a package-machine the combination with a bag-carrier mechanism of a bottom-sealing mechanism comprising a vertically-guided plunger, a rocking plate forming the plunger-head, a shearing-plate and outer supporting-plate forming jointly with said plunger-head a support for the sealing-strip, and feed-rolls for said strip, substantially as set forth.

17. In a package-machine the combination with a rotary bag-former table having a series of bag formers or carriers at the periphery thereof and means for forming the bags thereon, of a series of drying-rolls mounted in a fixed casing upon yielding supports and means within said casing for heating said rolls, substantially as set forth.

Signed by me at Philadelphia, Pennsylvania, this 17th day of November, 1899.

ADELBERT H. PHILLIPS.

Witnesses:
ANNA J. JONES,
W. G. STEWART.